C. F. BROWN.
LIQUID MEASURING REGISTER.
APPLICATION FILED SEPT. 7, 1912.
1,070,008.
Patented Aug. 12, 1913.
4 SHEETS—SHEET 1.
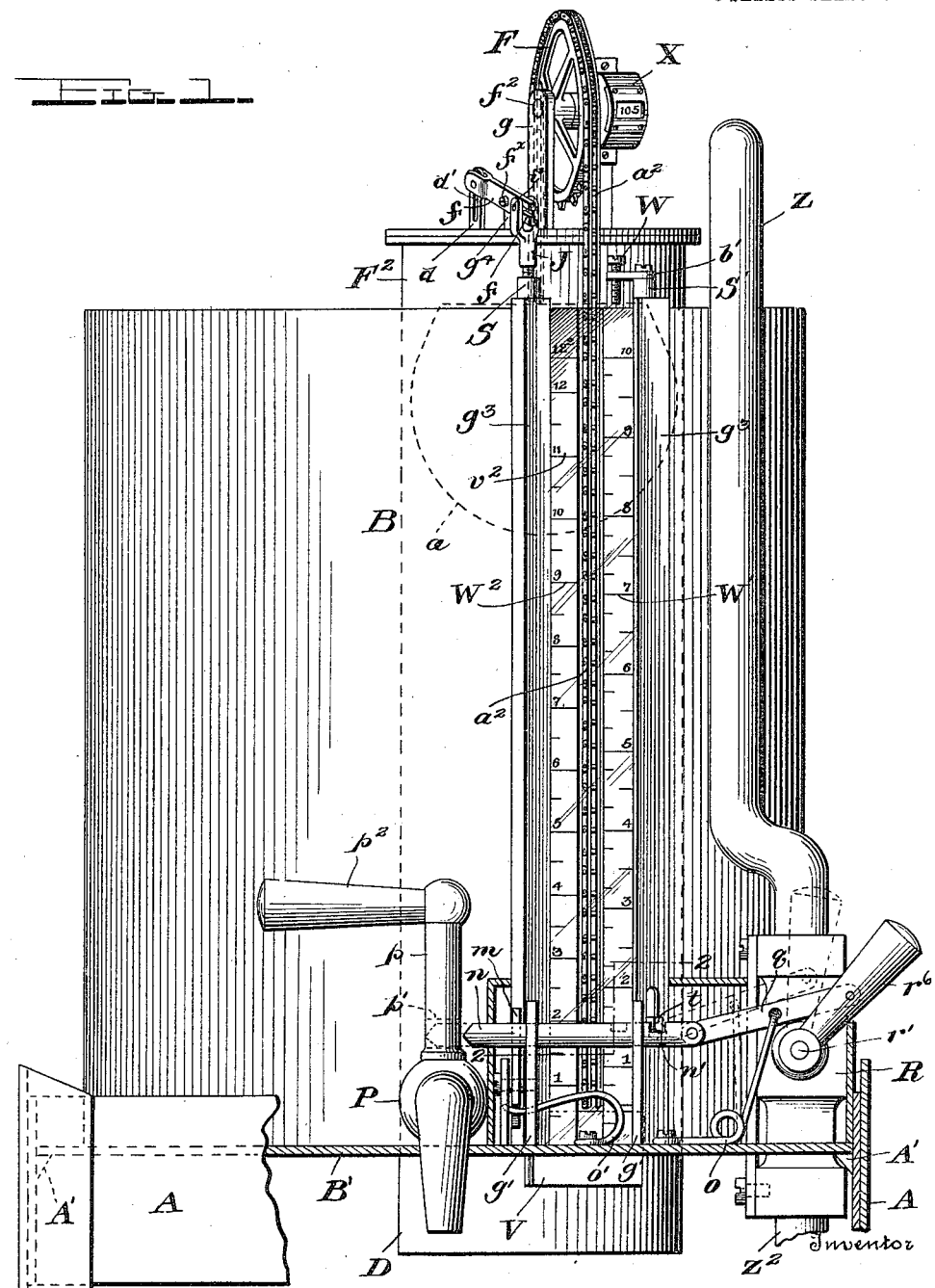
Witnesses
Chas. L. Giesbauer.
James B. Mansfield
Charles F. Brown,
By Alexander Lowell
Attorneys

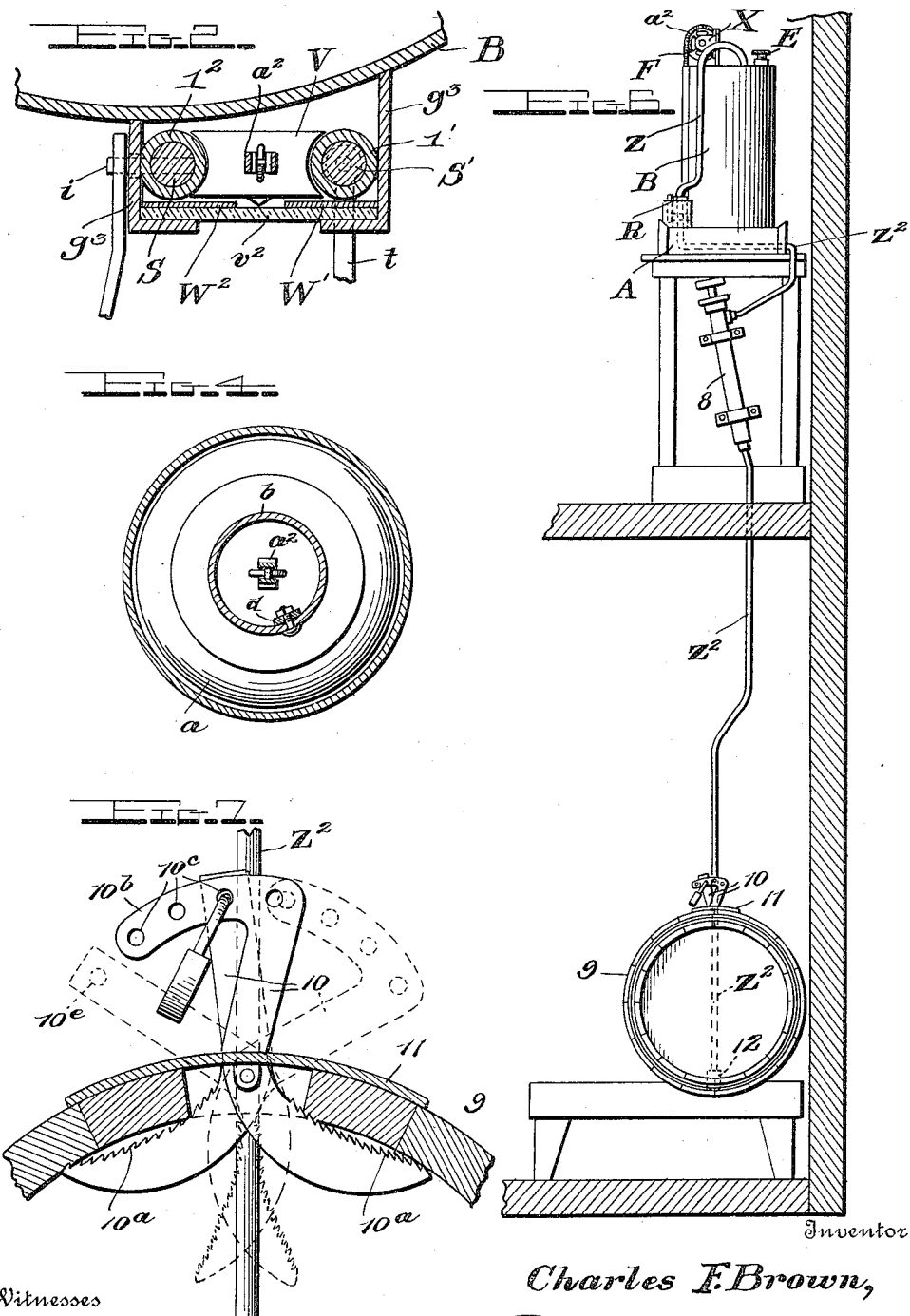

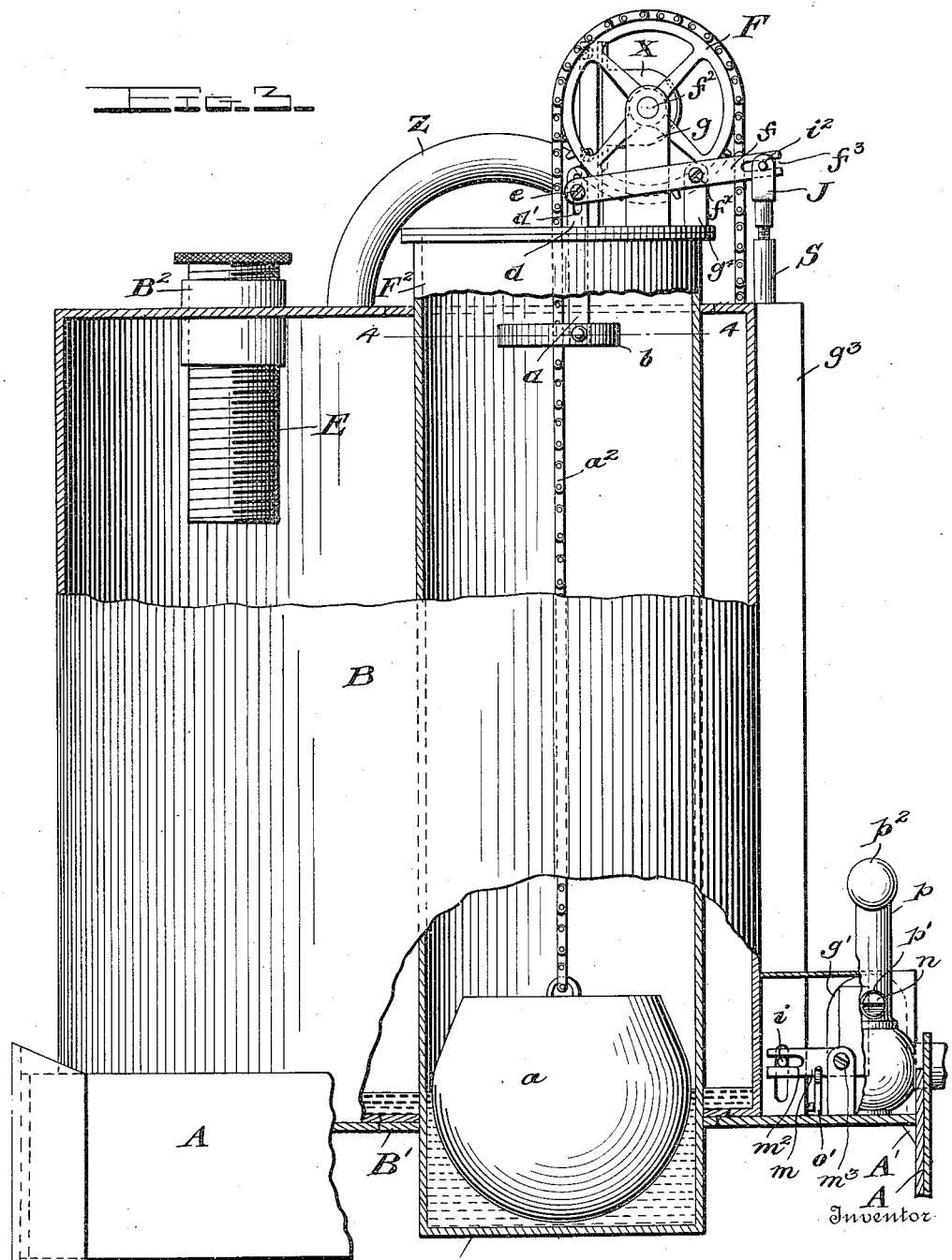

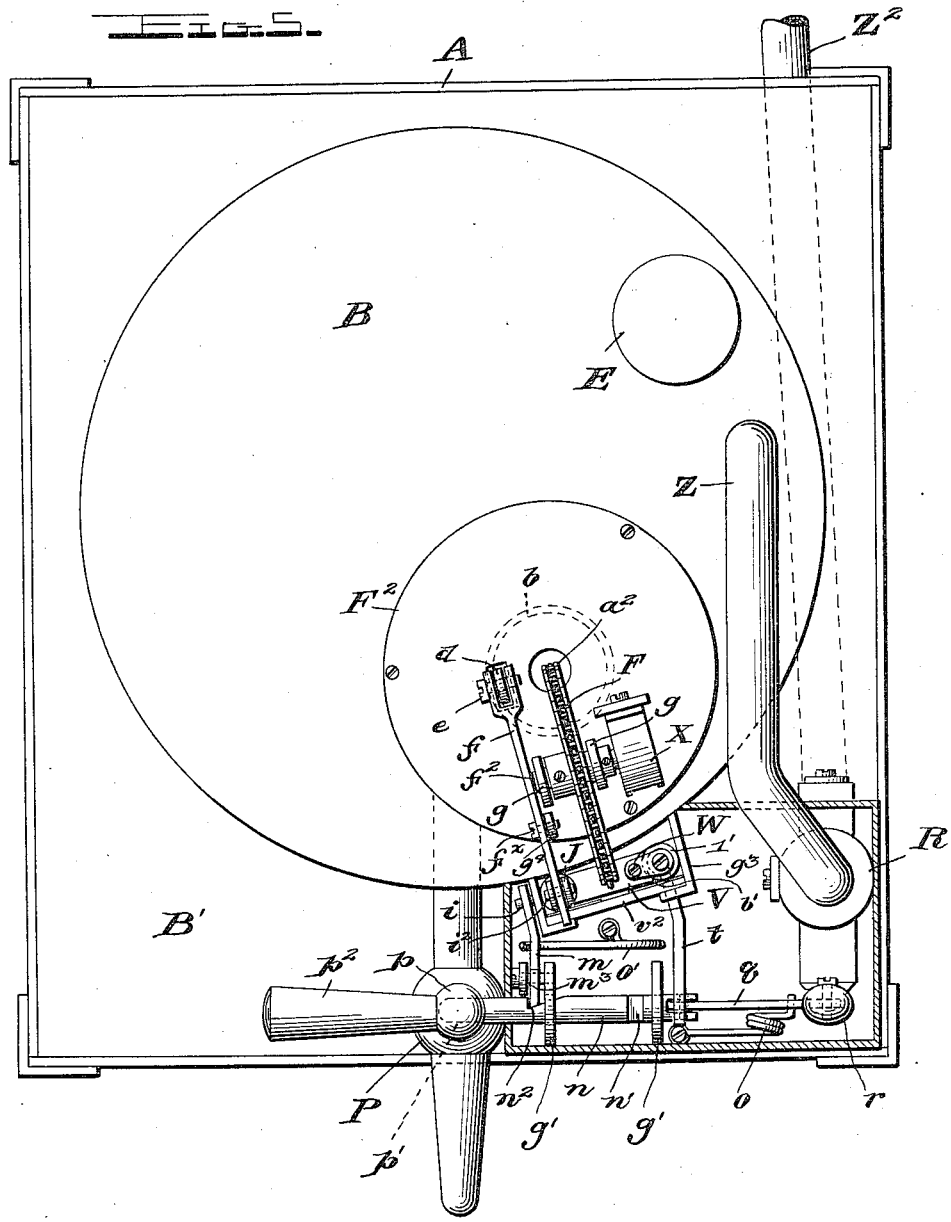

UNITED STATES PATENT OFFICE.

CHARLES FRANKLIN BROWN, OF NEW YORK, N. Y., ASSIGNOR, BY MESNE ASSIGNMENTS, OF ONE-HALF TO ARTHUR D. DICKERSON, OF FREEHOLD, NEW JERSEY.

LIQUID-MEASURING REGISTER.

1,070,008. Specification of Letters Patent. Patented Aug. 12, 1913.

Application filed September 7, 1912. Serial No. 719,258.

*To all whom it may concern:*

Be it known that I, CHARLES FRANKLIN BROWN, of New York, county of New York, and State of New York, have invented certain new and useful Improvements in Liquid-Measuring Registers; and I do hereby declare that the following is a full, clear, and exact description thereof, reference being had to the accompanying drawings, and to letters of reference marked thereon, which form part of this specification.

This invention is a novel liquid measuring or registering machine particularly designed for use in connection with liquid dispensing apparatus to accurately measure the amount of liquid which is withdrawn from a cask or other container and dispensed in small quantities.

The object of the invention is to accurately measure or register the quantity of liquid which is withdrawn from the original container and dispensed, and to prevent tampering with the contents of the container or surreptitious removal of any of the liquid from the container except through the apparatus, and at the same time to prevent waste by spilling of the liquid in dispensing same, and prevent theft of the liquid from the original container. The register of the measuring device will always show what quantity of liquid has passed therethrough; and also how much liquid has been dispensed in a given time; thus the dealer can accurately determine the amount of liquid actually originally supplied to him in the container, and the amount which has been dispensed through the apparatus.

A further object is to provide a liquid measuring register whereby the quantity of liquid drawn through the register is fully and correctly registered by registering wheels or devices; and whereby a predetermined amount of liquid must be forced into the measuring vessel before any liquid can be withdrawn therefrom; and when the proper amount of liquid has been forced into the vessel no more can be supplied thereto until such vessel has been fully emptied.

Another object is to provide automatic devices whereby the supply or inlet valve to the measuring vessel is automatically locked when the vessel is filled and automatically released when the vessel is emptied; and whereby the dispensing faucet or outlet valve of the measuring device is automatically locked when the vessel is emptied and automatically unlocked when the vessel is filled. And further to provide a measuring device wherein the opening of the supply valve will lock the outlet valve, and the supply valve will be locked before the outlet valve can be opened. By reason of this automatic locking of the supply and outlet valves if the capacity of the measuring vessel is known the total quantity of liquid passed therethrough can be readily determined by inspecting the registering devices whereby the quantity of liquid which is passed through the measuring vessel is indicated at all times; therefore the capacity of the measuring vessel for each charge or filling being once determined, the total amount of fluid passed therethrough will be registered with absolute certainty.

In order to prevent tampering with the original container from which the liquid is to be dispensed, or the contents of which are to be measured, the supply valve of the measuring vessel is so connected with the said container that it cannot be disengaged therefrom without the knowledge of the owner; which will render it impossible to abstract liquid from the container without detection.

I will now explain the invention in detail with reference to the accompanying drawings which illustrate one practical embodiment of the invention; but the invention is not restricted to the particular form or arrangement of parts shown in the drawings, as modifications thereof or equivalents of parts shown and described will suggest themselves to those skilled in the art when the invention is understood by them.

In said drawings Figure 1 is a front elevation partly in section of the liquid measuring register showing the supply valve locked in closed position, and unlocked in dotted lines. Fig. 2 is a detail section on line 2—2, Fig. 1. Fig. 3 is a side elevation partly in section of Fig. 1. Fig. 4 is a detail section on line 4—4, Fig. 3. Fig. 5 is a top plan view of Fig. 1, with part of the cover of the valve controlling devices broken away. Fig. 6 is a detail view illustrating one practical mode of using the measuring device for measuring the contents of an original package or container. Fig. 7 is a detail view of the devices for locking the supply pipe to the container.

As shown in the drawings the liquid registering device comprises a vessel B which may be made of any suitable material, preferably of metal and of a given capacity, for instance 10 pints or some multiple thereof. Liquid or other matter can be admitted into this vessel through a supply valve casing R the outlet of which is preferably connected by a pipe Z to the top of the vessel. In the casing R is a suitable valve operable by a stem $r'$ to which stem is connected a lever or handle $r^6$ by which the valve may be opened or closed. The inlet to the valve casing R may be connected by a supply pipe $Z^2$ to the container from which the liquid to be measured is drawn, and preferably as hereinafter described.

The liquid may be withdrawn from the vessel B through a dispensing faucet or outlet valve casing P which is provided with an ordinary valve having a stem $p$ and handle $p^2$ by which it can be operated by hand. In the stem $p$ is a transverse slot $p'$ which when the valve is closed is in line with a slidable bolt $n$ which is guided in suitable slotted brackets or studs $q'$ on the base plate B′ of the measuring device, which base plate may be supported on brackets A′ within a base frame A which may be of any suitable construction, to give a neat appearance to the apparatus. Thus bolt $n$ may be projected into engagement with the slot $p'$, as hereinafter described, so as to lock the outlet valve in closed position. When the inlet valve is open, and as shown, bolt $n$ is connected by a link $q$ to the handle $r^6$ of the supply valve, so that when bolt $n$ is retracted to disengage the stem $p$ of the outlet valve, the supply valve will be closed; and when the supply valve is opened the bolt $n$ will be projected into engagement with the slot $p'$ and lock the outlet valve; thus when the supply valve is closed the outlet valve can be operated; but when the supply valve is opened the outlet valve will be locked in closed position.

Automatic means are provided for locking the bolt $n$ in its retracted or projected position, as hereinafter described, and for shifting the bolt, at the proper time, so as to lock the supply valve and release the outlet valve when the vessel B is properly filled; and to lock the outlet valve and release the supply valve when the vessel B has been properly emptied. As shown bolt $n$ is provided with a notch $n'$ which is adapted to be engaged by a latch bar $t$ when the supply valve is closed and thereby locked to hold the supply valve closed; and the bolt $n$ is also provided with a notch $n^2$ adapted to be engaged by a catch lever $m$ to lock it when the supply valve is opened and the bolt is engaged with the slot $p'$ in the outlet valve stem. A spring of any suitable construction may be arranged to normally retract bolt $n$ from the slot $p'$ and hold the supply valve closed. For example a spring $o$ connected to the link $q$ and to plate B′, as indicated in the drawing, may be employed for this purpose. A spring $o'$ may be arranged to throw the catch lever $m$ into engagement with the notch $n^2$ see Figs. 1 and 5. Suitable means are provided as hereinafter described for automatically engaging and disengaging the latch $t$ and catch $m$ from the related notches in the bolt $n$ at the proper times.

Within the vessel B is placed a float $a$, which may be of any suitable construction, and to this float may be connected a sprocket chain $a^2$ which extends through a suitable opening in the top of the vessel and to and over a sprocket wheel F mounted on a shaft $f^2$ journaled in suitable bearings in standards $g$ on the top of the vessel. The outer side of wheel F projects slightly beyond the wall of the vessel B and the outer run of the chain is connected with a slidable weighted indicator V which is guided in a vertical indicator casing attached to the side of the vessel; said indicator casing consisting of closed angular side bars $g^3$ and a front glass or transparent plate $v^2$ secured therebetween. Within this casing at opposite sides of the weight may be secured brass tubes $l'$ and $l^2$. In the tube $l'$ is placed a rod S′ which extends below this tube and to its lower end is attached the catch $t$, so that by slightly lifting this rod S′ the catch $t$ can be disengaged from the notch $n'$ in bolt $n$. To the top of the rod S′ is attached a plate $b'$ through which is tapped an adjusting screw W which projects into the path of the indicator weight V and is adapted to be engaged by the latter when the float descends sufficiently in the vessel to lift the weight into engagement with screw W and actuate rod S′ and disengage catch $t$ from the notch $n'$ in the bolt. In the other tube $l^2$ may be placed a similar rod S, to the lower end of which is attached a pin $i$ which projects outwardly through a slot in the tube and adjacent side plate $g^3$ and into engagement with a slot $m^2$ in the rear end of the latch lever $m$ which is pivoted at its bend $m^3$ as shown, so that when rod S is lowered the lever $m$ will be disengaged from the notch $n^2$ in bolt $n$. To the upper end of rod S is screwed the shank of a yoke shaped piece J which is provided with a pin $i^2$ engaging a slot $f^3$ in a lever $f$ which may be pivoted at $f^x$ on a stud $g^4$ adjacent the wheel F, and the other end of this lever $f$ is pivotally connected to a pin $e$ which is adjustably secured in a slot $d'$ in a slide bar $d$ which extends through the top of the vessel and is preferably provided with a ring $b$ on its lower end that is adapted to be engaged by the float $a$ when the latter rises to the top of the vessel, and when ring $b$ is raised it will oscillate the lever $f$ and cause it to depress rod S, and thereby cause the disengagement of latch $m$ from the notch $n^2$ in the bolt $n$.

The front plate $v^2$ of the indicator may be provided with two scales $W^2$, $W'$; the former indicating "short measure" and the latter "long measure", which will be useful in dispensing liquids from the vessel through the outlet valve P, as the operator can by observing the position and movement of the indicator weight V relative to such scales see how much liquid he withdraws from the vessel. Mounted on the top of the vessel upon a bracket $g$ adjacent the bearings of the wheel F is a register X which may be of any suitable make and need not be described herein as the particular construction thereof is not claimed. Such register ordinarily comprises a series of axially alined numeral wheels, respectively indicating units, tens, hundreds, etc., and which wheels may be operated in the usual manner so as to total all operations or rotations of the units wheel. In the present instance the register is intended to show how many times the wheel F is rotated forwardly in one direction upon the rising of the float, said wheel being rotated rearwardly upon the descent of the float, during which time the registering wheels are idle.

In practice the length of stroke or extreme movement of the float $a$ should exactly correspond with the circumference of the wheel F, so that each time the float properly descends in the vessel the wheel F will be given one complete rotation. In other words each time the vessel is properly filled the wheel F will be turned one complete rotation by the descent of the float and before any more liquid can be supplied to the vessel. The float $a$ is therefore preferably made sufficiently heavy not only to raise the indicator V but also to operate the wheel F as it descends. As the vessel is filled with liquid and the float rises the indicator weight V will have sufficient power to turn wheel F in the reverse direction as at such time wheel F is freed from the registering mechanism, so that the latter is not affected by the reverse rotation of the wheel F or the rising of the float. The outlet valve is so connected to the vessel that when the float has descended to the proper point no more liquid can be withdrawn from the vessel through said outlet valve.

As shown in the drawings a pocket D may be formed in the base of the vessel so that when the float $a$ has descended to the desired point very little or no liquid will be in the vessel. The part $b$ is so adjusted that it will be engaged by the float and lifted and caused to actuate rod S and disengage the latch $m$ from the bolt $n$ when the proper amount of liquid has been introduced into the vessel. As shown the top of the vessel may be provided with a pocket, indicated at $F^2$ to receive the unsubmerged portion of the float and permit the lever $f$ to be actuated as described at the moment the vessel is properly filled.

It is important that the amount of matter or liquid which can be admitted into the vessel at each charge shall be uniform and accurately measured; and while the capacity of a given vessel can be accurately determined, vessels even if formed from the same pattern may not be exact duplicates in capacity and therefore I prefer to provide the vessels with means for adjusting the holding capacity thereof. For this purpose I provide a cylindric displacer body or plug E which may be projected more or less into the vessel, as by screwing it through a collar $B^2$ in the top of the vessel as indicated in Fig. 3. By making this displacer E project more or less into the vessel the amount of liquid which can be placed therein can be varied; and when the proper amount of liquid is in the vessel the displacer can be adjusted to insure that the float will effect the tripping of the latch $m$ at the proper moment, as described.

Operation: When the parts are properly constructed and arranged and the vessel empty the float will be in its lowermost position as indicated in full lines in Fig. 3, and the liquid level will then be at the bottom of the opening in the vessel connected with the outlet valve and rod $S'$ will be lifted by the indicator weight V and hold the latch $t$ out of engagement with notch $n'$ in bolt $n$. When the latch $t$ is disengaged from the bolt the supply valve may be opened by moving the handle to the left thereby forcing bolt $n$ toward the stem $p$. The outlet valve however must be in closed position before the supply valve can be opened, as the bolt $n$ must engage the slot $p'$ before the valve R can be opened, and when the bolt $n$ is projected into engagement with slot $p'$ the pawl $m$ engages the notch $n^2$ in bolt $n$ and locks the latter as indicated in Fig. 5, thereby locking the outlet valve in closed position and also locking the supply valve in open position. Fluid then passes from the pipe Z into the vessel and the float $a$ rises; while the indicator V descends, turning the wheel F idly forward. The parts are so arranged that when the proper amount of fluid is supplied to the vessel the float, having engaged ring $b$, will at the proper moment through the described connections depress rod S and cause the pin $i$ to disengage latch $m$ from bolt $n$; and as soon as latch $m$ is disengaged from the bolt $n$, spring $o$ retracts said bolt $n$ thereby closing and locking the supply valve and simultaneously releasing the outlet valve $p$; and dog $t$ engaging notch $n'$ locks the bolt $n$ in this retracted position, so that no more liquid can be introduced into the vessel until its contents have been withdrawn through the dispensing faucet or outlet valve. When the float has again descended to its lowest position, as indicated in Fig. 3, the operation of refilling the vessel is repeated as above described.

When used in connection with liquid dispensing apparatus the supply valve may be connected by a pipe $Z^2$ to a pump 8, such as is ordinarily used in liquid dispensing apparatus, and this pump is connected by a tin lined pipe $Z^2$ with a container 9, which may be a barrel or other suitable holder from which the liquid is to be dispensed; preferably pipe $Z^2$ is attached to and passes through a plate 11 which is large enough to cover the bung-hole opening in the container if the latter be a barrel; and pipe $Z^2$ may be provided with the usual strainer 12 on its end within the container. And pivotally connected to this plate 11 is a pair of levers 10 which project above the plate, but below the plate these levers are curved in opposite directions and serrated as indicated at $10^a$ and above the plate the levers are bent in opposite directions and one of these levers has on its upper end a segment $10^b$ provided with openings $10^c$ any one of which may be brought into register with an opening $10^e$ in the upper end of the opposite lever; and when the upper ends of these levers are brought toward each other their lower ends are separated and engaged in the barrel at opposite sides of the bung opening, and the upper ends of the levers may be locked together by a suitable padlock, as indicated in full lines in Fig. 7, and when so locked it will be impossible for the supply pipe to be removed from the container, or for any fluid to be surreptitiously removed from the container.

As the liquid measuring register is designed to register not only the quantity of liquid passing therethrough, but also the contents of the containers so as to check the invoices; the containers must be protected from workmen and employees who may have access to the room where the container is stored, to give protection to both shipper and purchaser. And an accurate register, for the purposes described, must not only register correctly but must protect the contents of the container after the supply pipe is connected therewith until the contents are fully measured and the container empty, or the purchaser would not have a just claim on the shipper for any shortage.

Some means for locking the supply pipe to the container or sealing the connection between the supply pipe and the container is essential to the successful operation of the device to measure the contents of the container; to determine if the proper amount was originally contained therein; if it was possible to abstract liquid from the container without detection after my measuring device was attached thereto, a shortage indicated by my device would not be evidence that the contents of the container was not correctly billed; but by locking the supply pipe to the container no liquid can be removed therefrom other than through the registering device unless an opening be made in the container or in the supply pipe between the container and the registering device, which of course would be readily detected. Preferably the sprocket F as stated is adapted to make one complete rotation for each complete descent of the float, and the units register wheel is adapted to register one unit for every one-tenth revolution of the wheel F, or ten units for a complete revolution thereof, and therefore it is preferable to have the vessel made to contain 10, 20, 30 or more units of measure according to the length of the stroke of the travel of the float, so that the amount of liquid withdrawn therethrough will be accurately registered each time the float descends.

In my invention the vessel, of whatever size it may be, must be adjusted to an exact quantity, and this quantity must then be put into the vessel before any part can be removed, and when the vessel is once filled no more can be pumped into it until it has been emptied and each filling correctly registered.

What I claim is:

1. In combination, a measuring vessel having an inlet, and an outlet; an inlet valve; an outlet valve; and means for locking the outlet valve when the inlet valve is opened, and for locking the inlet valve when the outlet valve is opened; with a float in the vessel, means whereby the float controls the valve locking devices, a registering mechanism, and connections for operating the registering mechanism by the said float.

2. In combination, a measuring vessel having an inlet, and an outlet; an inlet valve; an outlet valve, and means for locking the outlet valve before and while the inlet valve is opened, and for locking the inlet valve before and while the outlet valve is opened; with a float in the vessel an indicator outside the vessel, a wheel, a chain running over said wheel connecting the float with said indicator, and a registering mechanism connected with said wheel whereby the amount of fluid which passes through the vessel is registered.

3. In a dispensing apparatus the combination of a vessel, an inlet valve controlling the admission of matter thereinto, an outlet valve controlling the withdrawal of matter therefrom, and means whereby the inlet valve is locked when the vessel is filled, and remains locked until the vessel is emptied;

with a float in the vessel, means whereby the float controls the valve locking devices, a registering mechanism, and connections for operating the registering mechanism by the float to determine the amount of liquid passed through the vessel.

4. In a dispensing apparatus the combination of a vessel, an inlet valve controlling the admission of matter into the vessel, an outlet valve controlling the withdrawal of matter therefrom, and means whereby the inlet valve is locked when the vessel is filled, and remains locked until the vessel is emptied; with a float in the vessel, an indicator weight outside the vessel, a wheel, a chain running over said wheel connecting the float with said weight, and a registering mechanism connected with said wheel whereby the amount of fluid which passes through the vessel is registered.

5. In combination a vessel, a supply thereto, an outlet therefrom, a supply valve, an outlet valve, means controlled by the supply valve for locking the outlet valve when the supply valve is open, and means for locking the supply valve when the outlet valve is open; with a float in the vessel, and devices connected with said float for tripping the valve locking means; a registering mechanism, and connections for operating the registering mechanism by and from the movement of the said float to register the amount of liquid passed through the vessel.

6. In combination a vessel, a supply valve controlling the admission of matter to the vessel; an outlet valve, means whereby the supply valve is locked when the vessel is filled and remains locked until the vessel is emptied; with a float in the vessel, and devices controlled by said float for tripping the supply-valve locking means; and means whereby the outlet valve is locked when the supply valve is opened and remains locked until the vessel is filled and the supply valve closed; a registering mechanism and connections for operating the registering mechanism by and from the movement of the said float to register the amount of liquid passed through the vessel.

7. In combination a vessel, a supply thereto, an outlet therefrom, a supply valve, an outlet valve, means controlled by the supply valve for locking the outlet valve when the supply valve is open, and means for locking the supply valve when the outlet valve is open; a float in the vessel, and devices connected with said float for tripping the valve locking means; with a registering device, an indicator, a wheel connected with the registering device, and a chain passing over said wheel and connecting the float to the indicator weight whereby the register is actuated by the descent of the float to register the amount of liquid passed through the vessel.

8. In combination a vessel, a supply valve controlling the admission of matter to the vessel; an outlet valve, means whereby the supply valve is locked when the vessel is filled and remains locked until the vessel is emptied; a float in the vessel, and devices controlled by said float for tripping the supply-valve locking means; and means whereby the outlet valve is locked when the supply valve is opened and remains locked until the vessel is filled and the supply valve closed; with a registering device, an indicator, a wheel connected with the registering device and a chain passing over said wheel and connecting the float to the indicator weight whereby the register is actuated by the descent of the float to register the amount of liquid passed through the vessel.

9. In a liquid measuring apparatus, the combination of a vessel, a supply valve, an outlet valve, means for locking the outlet valve when the supply valve is open, and for locking the supply valve when the outlet valve is open; a container for the fluid to be measured; a draft pipe for conducting fluid from the container to the supply valve; and means for detachably locking the draft pipe to the container to prevent tampering with the contents of the container; with a float in the vessel, means whereby the float controls the valve locking mechanism, a registering mechanism, and connections for operating the registering mechanism by the said float to determine the amount of liquid passed through the vessel.

10. In a liquid measuring apparatus, the combination of a vessel; a supply valve, an outlet valve, means for locking the outlet valve when the supply valve is open, and for locking the supply valve when the outlet valve is open; a container for the fluid to be measured; a draft pipe for conducting fluid from the container to the supply valve; and means for detachably locking the draft pipe to the container to prevent tampering with the contents of the container; with a registering device, an indicator, a wheel connected with the registering device, and a chain passing over said wheel and connecting the float to the indicator whereby the register is actuated by the descent of the float to register the amount of liquid passed through the vessel.

11. In combination, a vessel, a supply thereto, an outlet therefrom, a supply valve, an outlet valve, means for closing the supply valve when the proper amount of liquid is supplied to the vessel, a float in the vessel, and devices connected with said float for tripping the valve closing means when the fluid in the vessel raises the float to proper position, and means for adjusting the fluid level in the vessel to insure that the float shall trip the valve closing means when the proper amount of fluid is supplied to the vessel, a registering mechanism and means controlled by the float for operating the registering mechanism.

12. In combination, a vessel, a supply thereto, an outlet therefrom, a supply valve, an outlet valve, means controlled by the supply valve for locking the outlet valve when the supply valve is open, and means for locking the supply valve when the outlet valve is open; a float in the vessel, devices connected with said float for tripping the valve locking means, and means for regulating the height of the liquid in the vessel so as to cause the float to actuate said tripping means when the proper amount of fluid has been supplied to the vessel, a registering mechanism and means controlled by the float for operating the registering mechanism.

CHARLES FRANKLIN BROWN.

Witnesses:
 JAS. A. BROWN,
 JOS. ISAACS.

---

Copies of this patent may be obtained for five cents each, by addressing the "Commissioner of Patents, Washington, D. C."